Figure 1:
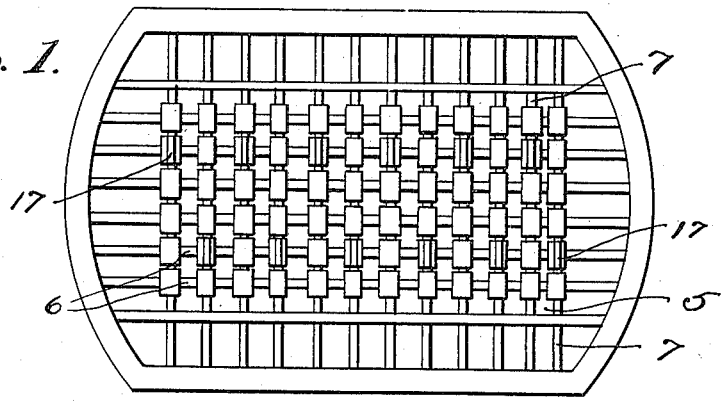

C. E. R. MARSH.
DISH TRAY.
APPLICATION FILED MAR. 29, 1917.

1,261,257. Patented Apr. 2, 1918.

Inventor
C. E. R. Marsh.

Witnesses.

By

Attorneys.

UNITED STATES PATENT OFFICE.

CYNTHIA E. R. MARSH, OF SPRINGFIELD, MASSACHUSETTS.

DISH-TRAY.

1,261,257.

Specification of Letters Patent.

Patented Apr. 2, 1918.

Application filed March 29, 1917. Serial No. 158,433.

*To all whom it may concern:*

Be it known that I, CYNTHIA E. R. MARSH, a citizen of the United States, residing at Springfield, in the county of Hampden, State of Massachusetts, have invented certain new and useful Improvements in Dish-Trays; and I do hereby declare the following to be a full, clear, and exact description of the invention, such as will enable others skilled in the art to which it appertains to make and use the same.

This invention relates to trays, and more particularly to trays employed for draining dishes.

The primary object of the invention is to provide a tray in which the dishes may be stacked to drain without injury thereof.

A further object of the invention is to provide a tray in which the dishes are maintained on edge in spaced relation one to the other.

Figure 3:
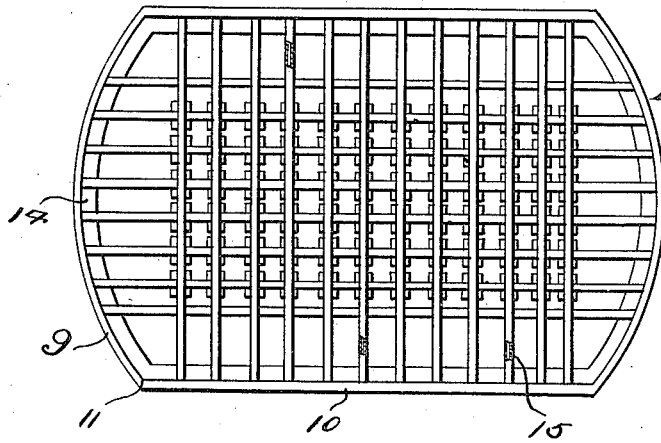
Figure 2:
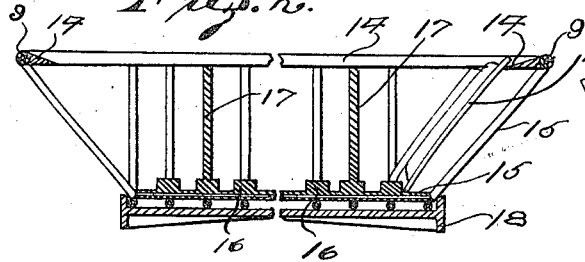
Figure 4:
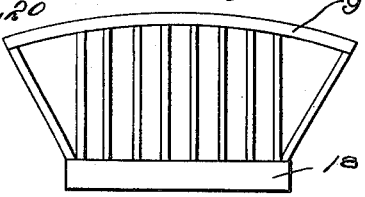

Referring to the drawings:

Figure 1 is a top plan view of the device,
Fig. 2 is a longitudinal sectional view,
Fig. 3 is a bottom plan view, and
Fig. 4 is an end view.

Referring more particularly to the drawings, reference character 5 designates the tray which is formed of a plurality of longitudinally extending wires 6 and transversely extending wires 7. The transversely extending wires 7 may be secured to the longitudinally extending wires 6 at their point of intersection in any suitable manner.

The free ends of the longitudinally extending wires 6 are connnected by curved or arcuate wire members 9, and the free ends of the transversely extending wires 7 are connected by wires 10, which latter have their free ends suitably secured to the free ends of the curved or arcuate wires 9 as at 11. The free ends of the longitudinally extending wires 6 and the free ends of the transversely extending wires 7 are bent upwardly to form the sides and ends of the tray.

The curved or arcuate wires 9 and the wires 10 are provided with a soft rubber lip 14 which is secured to said wires 9 and 10 and as shown in Fig. 2 said lip is preferably tapered and extends inwardly of the tray and projects downwardly thereof. All of the wires forming the bottom and sides of the tray are provided with a covering 15 of soft pliable material, which is preferably sponge rubber and at their points of intersection the wires are provided with projections or knobs 16 also formed of the soft pliable material which incases the wires. Projecting upwardly from each of the transversely extending wires 7 at one of its points of connection with one of the longitudinal wires are separators or spacers 17 which are preferably rectangular in form and are formed of soft pliable material such as sponge rubber, and said separators or spacers 17 are arranged in staggered relation one to the other as shown in Fig. 1.

The tray is supported upon a suitable base 18 preferably formed of sheet metal and secured at the ends of the bottom of the tray on the exterior face thereof.

In use, a plate 20 is placed on edge with its bottom face engaged behind one of the projections 16 and its upper edge lying in engagement with the soft rubber lip 14 as shown in Fig. 2. With the plate thus positioned a second plate is placed with its lower edge behind the projections 16 directly in front of the projections 16 engaged by the lower edge of the plate 20 and in front of the first spacer or separator 17. Upon releasing the second plate it will be seen that it will be supported in position by the first plate 20 but it will be held in spaced relation thereto by means of the spacer or supporter 17. Each succeeding plate is thus placed in position and is maintained in spaced relation to each adjacent plate by means of the spacers or separators 17 thus preventing chipping of the plates or accidental breaking thereof.

Having thus described the invention, what is claimed is:—

1. A dish draining tray comprising a wire basket, a soft pliable material inclosing the wires of said basket, and a plurality of soft pliable separating elements projecting from the intersections of the bottom wires, and arranged in staggered relation one to the other.

2. A dish draining tray comprising a wire basket a soft pliable material inclosing the wires of said basket, and integral lugs projecting from the soft pliable material at the intersections of the bottom wires of the basket.

3. A dish draining tray comprising a wire basket, a soft pliable material inclosing the wires of said basket, lugs projecting upwardly from the bottom of the basket and positioned at the intersections of the bottom wires of the basket, and spacing members projecting from certain of said lugs and arranged in staggered relation one to the other.

4. A dish draining tray comprising a wire basket, a soft pliable material inclosing the wires of said basket, lugs projecting upwardly from the bottom of said basket, and positioned at the intersections of the bottom wires of the basket, and spacing members of soft pliable material projecting from said lugs in staggered relation one to the other, each of said spacing members being formed integral with the respective lug from which it projects.

5. A dish draining tray comprising a wire receptacle, a soft pliable material inclosing each of the wires of said receptacle, knobs projecting from the bottom of the receptacle and secured to said wires at their points of intersection, and dish spacing elements of soft pliable material projecting inwardly of the tray and arranged in staggered relation one to the other, said dish spacing elements adapted to engage the dishes to maintain them in spaced relation out of contact with each other.

In testimony whereof, I affix my signature in the presence of two witnesses.

CYNTHIA E. R. MARSH.

Witnesses:
 FLORENCE M. DADNUN,
 OLIVER MARSH.